Aug. 11, 1942.  W. E. S. STRONG  2,292,410
MOLDING APPARATUS
Filed Dec. 31, 1940  2 Sheets-Sheet 1
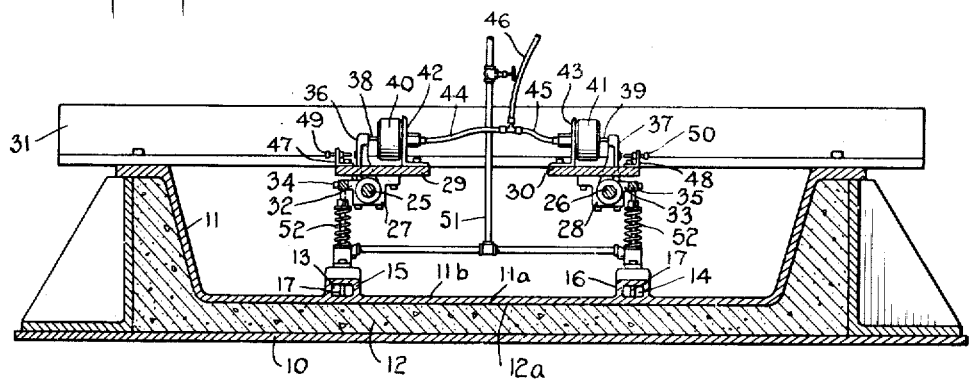
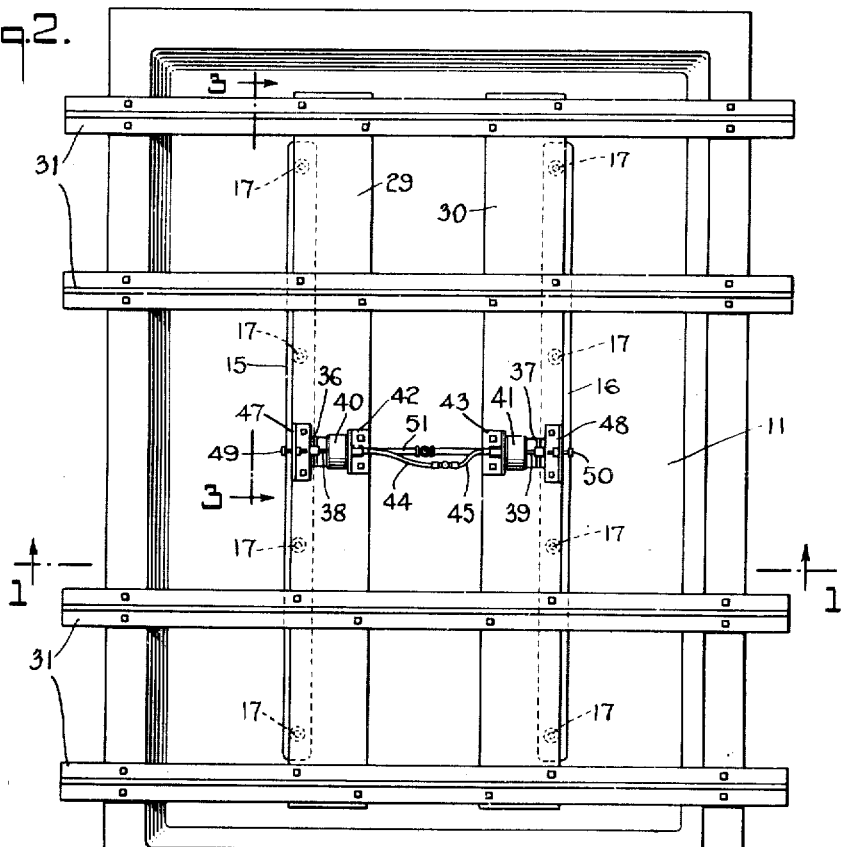
INVENTOR
William E.S.Strong
Harry J. Lucke
ATTORNEY Aug. 11, 1942.  W. E. S. STRONG  2,292,410
MOLDING APPARATUS
Filed Dec. 31, 1940  2 Sheets-Sheet 2
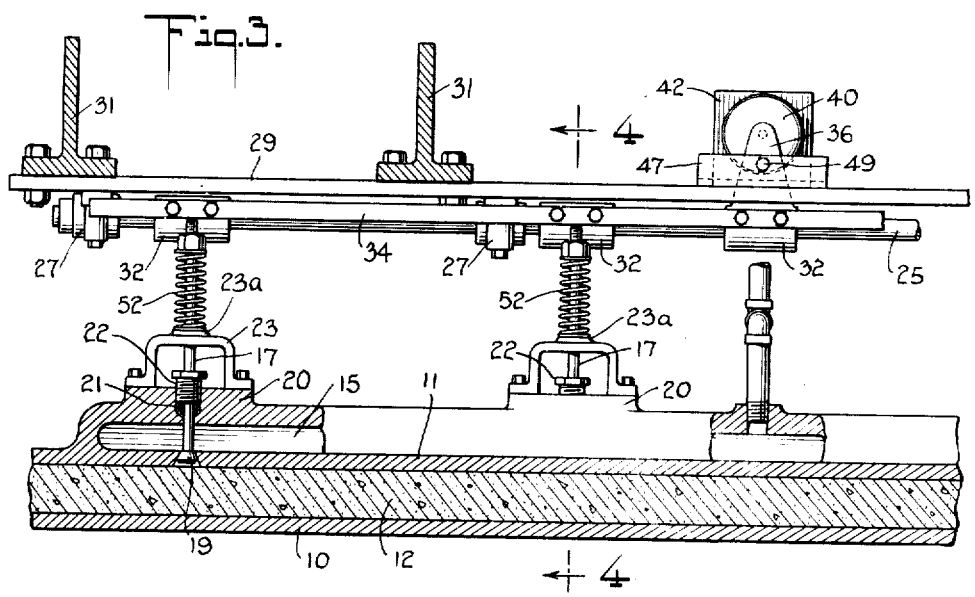
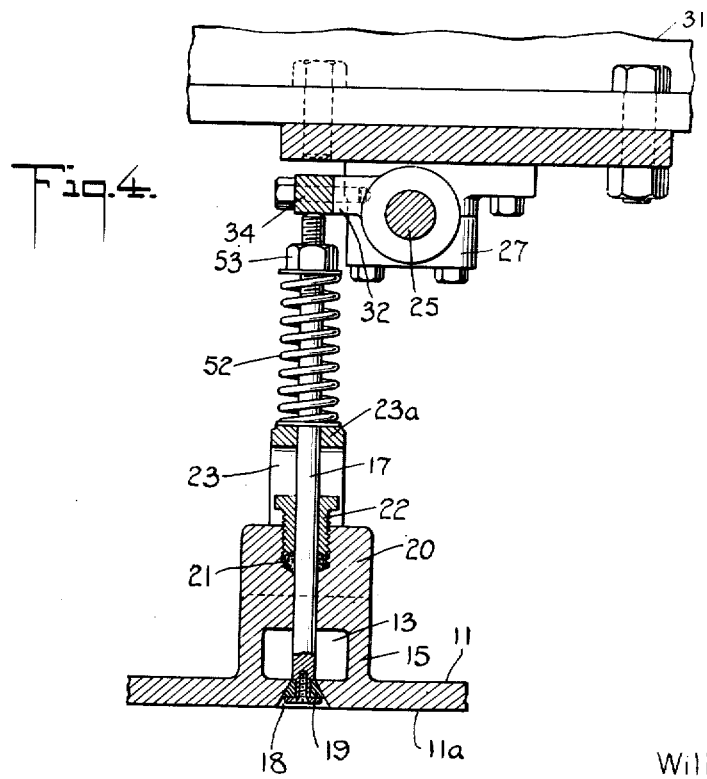
INVENTOR
William E. S. Strong
BY
Henry J. Lycke
HIS ATTORNEY Patented Aug. 11, 1942

2,292,410

UNITED STATES PATENT OFFICE 2,292,410

MOLDING APPARATUS

William E. S. Strong, New York, N. Y., assignor to John B. Pierce Foundation, New York, N. Y., a corporation of New York Application December 31, 1940, Serial No. 372,521

4 Claims. (Cl. 25—120)

This invention relates to apparatus useful in the molding of plastic materials to predetermined shape.

In the molding of certain plastic materials, and especially those with delayed setting or hardening characteristics, as for instance, concrete, which have been compressed within a mold cavity during the molding operation, it has heretofore been found advantageous to facilitate removal of the mold from the molded article, and to guard against damage to the molded article, by introducing compressed air between the form surface of the removable mold-cover and the corresponding face of the molded material. The present invention constitutes an improvement in apparatus designed to accomplish this purpose.

It is a primary object of the invention to provide apparatus of the above described type which will be considerably more positive in operation than has been prior apparatus of the type, and which will accomplish its purpose smoothly and efficiently.

An important feature of embodiments of the invention resides in the provision of slender passage means in the mold part which is to be removed from the molded article after the molding operation, the stated passage means being located proximate the forming surface of the mold part for the purpose of conducting fluid, under pressure, to mechanically operated valves which control communication between the passage means and the interior of the mold at locations where the forming surface of the mold part and the formed surface of the molded article are contiguous. The fact that the valves are operated independently of the force of the pressure fluid which passes through them is another feature of the invention.

Further objects and features will be apparent from the following detailed description of one preferred embodiment of the invention, and from the accompanying drawings thereof.

In the drawings, which illustrate the invention as applied to apparatus for molding cementitious slab units for building purposes:

Fig. 1 represents a vertical section taken through the covered and filled mold box of Fig. 2 as it appears immediately following a molding operation and before the forming cover is removed. The section is taken on the line 1—1, Fig. 2.

Fig. 2 represents a top plan view of the apparatus illustrated in Fig. 1.

Fig. 3 represents a fragmentary vertical section, enlarged, as taken on the line 3—3, Fig. 2.

Fig. 4 represents a still further enlarged fragmentary vertical section taken on the line 4—4 of Fig. 3.

The invention is not restricted in its application to any specific type or form of molding apparatus. For the sake of convenience, it is here specifically illustrated and described with respect to molding apparatus of the type disclosed by the present inventor in his U. S. Pat. 2,193,847, entitled Method of producing molded concrete products and apparatus therefor, and issued March 19, 1940.

In such type of apparatus, the cementitious material is molded within the confines of a mold box and a forming cover, while the mold box is being jarred, there being pressure applied to the forming cover to compress the plastic contents of the mold box during the forming operation.

The mechanism for jarring the mold box 10 and the mechanism for pressing the forming cover 11 down onto the plastic cementitious material 12 within the mold box 10, are not illustrated in the drawings, since they do not in themselves constitute part of the present invention.

In removing the forming cover 11 from the mold box 10, immediately following a molding operation, it is necessary to overcome the suction-effect which occurs between the forming surface 11a of the forming cover 11 and the formed surface 12a of the molded article contiguous thereto. For this purpose, compressed air, or some other suitable fluid under pressure, is introduced into the mold between the forming surface 11a and the formed surface 12a.

For obtaining positive release of the forming surface 11a from the formed surface 12a over the entire area thereof, the compressed air is introduced from passage means which are slender in cross-section, and through independently controlled valve means arranged in substantially single file along said slender passage means. Thus, provision is made for a positive introduction of the compressed air under a pressure which is substantially the same as that at which it is delivered to the apparatus, thereby insuring thorough separating action, as required.

The passage means are here provided in the form of conduits 13 and 14, defined by the peripheral walls 15 and 16, respectively, which rise from the reverse surface 11b of forming cover 11 and extend, preferably parallel with each other, lengthwise along the forming cover.

It should be noted that, to effect the purposes of the invention, the slender passage means, represented in this instance by the conduits 13 and 14, are strategically located, having due regard to the area and shape of the forming surface of the movable mold part, here the forming cover 11, so as to insure effective distribution of the pressure fluid over substantially the entire area of the forming surface. Because the passage means are of relatively restricted cross-section, that is, of a cross-section approximating that of the piping which conveys the fluid to the apparatus, and thus substantially retain the original pressure of the fluid, each length of the passage means is effective over a considerable area.

In order to control the introduction of compressed air to the interior of the mold at the desired location, namely, between the forming surface 11a and the formed surface 12a, normally closed valved openings are provided between the forming surface 11a of the forming cover and the conduits 13 and 14. They are placed at appropriately spaced intervals along the lengths of the conduits 13 and 14, and comprise, in the illustrated instance, ports which are preferably frusto-conical in form having their wide mouths opening into the forming surface 11a. Because the conduits are slender, the ports are arranged in substantially single file, thus enabling the ports to have adequate width. Working within the ports 18 are valve stems 17 having valve heads, which preferably comprise frusto-conical washer elements 19, of rubber or like yieldable material, replaceably secured to the head ends of the valve stems by means of screws and retaining washers in well known manner.

The valve stems 17 extend and work through the conduits 13 and 14, and, to this end, pass through bosses 20, formed at appropriate locations spaced apart along the top portions of conduit walls 15 and 16, see Fig. 3. For preventing leakage of air around valve stems 17, air tight packing arrangements of well known type are provided in suitable recesses formed in the bosses 20. Packing material 21 is compressed within the recesses and about the valve stems 17 by means of packing nuts 22, threaded within the recesses.

Since it is essential that the valves function regularly and positively, provision is made for mechanically depressing the valve stems 17 as and when required. For this purpose, the valve stems 17 extend upwardly through boss portions 23a of yokes 23, the yokes being advantageously secured to the bosses 20 by means of bolts as illustrated. The upper ends of the valve stems 17 are thus in a position for engagement by mechanical depressing means.

In the present instance, the mechanical depressing means are constructed and arranged for actuation by the force of compressed air. Rocker shafts 25 and 26 are journaled in brackets 27 and 28, respectively, which depend from the underside of supporting elements 29 and 30, respectively, in mutually spaced relationship. The supporting elements 29 and 30 span a series of frame elements 31, which may be structural steel of T formation.

Secured to the rocker shafts 25 and 26 are sets of rocker arms 32 and 33, respectively, and secured to the ends of the rocker arms, as by means of machine screws, see Fig. 4, are depresser bars 34 and 35, respectively. The depresser bars are arranged with normal rest positions immediately above the top ends of the valve stems 17.

For depressing the depresser bars 34 and 35 at desired intervals, respective actuating arms 36 and 37 are mounted on the rocker shafts 25 and 26, respectively, preferably adjacent their mid portions as illustrated, and extend upwardly therefrom. Attached to the upper ends thereof, respectively, are the drive pins 38 and 39 of standard type, air-actuated, reciprocating motivators 40 and 41, respectively, such actuators being secured on upstanding brackets 42 and 43, respectively, which are, in turn, secured to the upper surfaces of supporting elements 29 and 30, respectively. Flexible air hoses 44 and 45 connect the actuators 40 and 41, respectively, with the main air hose 46, which leads to a suitable source of compressed air.

For controlling the length of stroke of the actuating arms 36 and 37, and, thus, for controlling the degree of opening of the valved apertures 18 by the valve stem heads 19, there are provided adjustable limit stop means. The illustrated limit stop means comprises bracket pieces 47 and 48, respectively, secured to the upper surfaces of supporting elements 29 and 30, respectively, and adjustable stop screws 49 and 50 threaded through the upstanding elements of brackets 47 and 48, respectively.

When air is supplied to the actuators 40 and 41, by suitable control means (not shown) provided in the air supply system, the depressor bars 34 and 35 are actuated to press downwardly upon the valve stems 17, and to, thus, open communication between the conduits 13 and 14 and the interior of the mold box between the forming surface 11a of the forming cover and the formed surface 12a of the molded product.

Compressed air is supplied to the conduits 13 and 14 through piping indicated generally at 51, the air line being normally open and operative to supply air continually. The conduits 13 and 14 are distinctly conduits, with a limited cross sectional area so that the air flowing therethrough will have approximately the same pressure as when supplied through the supply pipe. Accordingly, compressed air positively forces its way through the partially opened apertures 18 and into the mold box as the forming cover is being lifted away from the mold box proper.

For returning the valve stems 17 to normally raised position with the valve heads 18 fitting snugly against the walls of recesses 18, and for retaining the valve stems in such raised position, coil springs 52 are disposed about the valve stems, and work between the bosses 23a of yokes 23 and tension nuts 53, which are threaded on the upper ends of the valve stems 17.

The operation of the herein described mechanism is, of course, correlated with the operations of the mechanisms which jar the mold box 10 and which press forming cover 11 into place, thereby insuring the injection of compressed air into the closed mold box at just the proper times for it to accomplish its intended function. Suitable control means for the purpose are well known and need not be described herein.

Where as this invention has been described with respect to a specific embodiment thereof it is to be thoroughly understood that many changes may be made in the described embodiment and many other embodiments may be devised without departing from the generic spirit and scope of the invention as set forth herein and in the claims that follow.

I claim:

1. In molding apparatus equipped with a removable mold part which provides a portion of the forming surface of the mold, slender conduit means associated with the said movable mold part, being disposed adjacent to and extended along the said forming surface thereof; means for supplying fluid under pressure to said conduit means; ports extending from communication with said conduit means to communication with said forming surface, said ports being arranged substantially single file along the length of said conduit means; valve means operable within said ports to open and close the same; means disposed exteriorly of said conduit means for normally holding the said valve means closed; mechanical means disposed exteriorly of said conduit means for positively opening said valve means at desired intervals; and means for controlling the operation of said mechanical means.

2. In molding apparatus equipped with a removable mold part which provides a portion of the forming surface of the mold, slender conduit means, associated with said removable mold part and extending adjacent and along the said forming surface thereof; means for supplying fluid under pressure to said conduit means; ports communicating with said conduit means at spaced intervals along the length thereof and arranged in substantially single file, said ports extending into communication with said forming surface and diverging outwardly toward said forming surface; valve heads operable in said ports, said valve heads being divergent for closing cooperation with said ports; valve stems extending from said valve heads through and exteriorly of said conduit means; spring means associated with said valve stems exteriorly of said conduit means and normally urging said valve heads into closed placement against the walls of said ports; mechanical means disposed exteriorly of said conduit means for pushing groups of said valve stems, in common, against the force of said spring means to displace the valve heads and thus open communication between said conduit means and said forming surface; and means for controlling the operation of said mechanical means.

3. In molding apparatus for molding slab blocks, a mold box; a forming cover for said mold box; a plurality of long, substantially rectilinear conduits of relatively restricted cross-section formed and spaced apart on said forming cover adjacent to and extended along the forming surface thereof; ports communicating with said conduits at spaced intervals along their lengths and extending into communication with said forming surface; headed valve stems operative in said ports, said ports being configurated to limit backward movement of said valve stems by seating engagement of the heads of said valve stems therewith; spring means normally urging said valve stems backwardly to seat the head ends of said valve stems and to thus close said ports; substantially rectilinear actuating fingers mounted on common rocker shafts and disposed in such manner as to push groups of the said headed valve stems forwardly, simultaneously, against the tension of said spring means when the said rocker shafts are rotated; and means adapted to be motivated simultaneously for rotating said rocker shafts at desired intervals.

4. In molding apparatus for molding slab blocks, a mold box; a forming cover for said mold box; a plurality of conduits of relatively restricted cross-section formed and spaced apart on said forming cover adjacent to and extended along the forming surface thereof; ports communicating with said conduits at spaced intervals along their lengths and extending into communication with said forming surface; headed valve stems operative in said ports, said ports being configurated to limit backward movement of said valve stems by seating engagement of the heads of said valve stems therewith; spring means normally urging said valve stems backwardly to seat the head ends of said valve stems to thus close said ports; actuating fingers mounted on common rocker shafts and disposed in such manner as to push groups of said headed valve stems forwardly, simultaneously, against the tension of said spring means when the said rocker shafts are rotated; and means adapted to simultaneously rotate said rocker shafts at desired intervals.

WILLIAM E. S. STRONG.